UNITED STATES PATENT OFFICE.

HERMAN HEUSER, OF EVANSTON, ILLINOIS.

ART OF PREPARING LOW-ALCOHOLIC AND NON-ALCOHOLIC BEVERAGES.

1,401,700.  Specification of Letters Patent.  Patented Dec. 27, 1921.

No Drawing.  Application filed January 12, 1920.  Serial No. 350,955.

*To all whom it may concern:*

Be it known that I, HERMAN HEUSER, a citizen of the United States, residing at Evanston, in the county of Cook and State of Illinois, have invented a new and useful Improvement in Art of Preparing Low-Alcoholic and Non-Alcoholic Beverages, of which the following is a specification.

The present invention relates to the manufacture of beverages low in alcohol or substantially free therefrom and more particularly to those produced from fermented beverages as initial materials and having the taste, flavor, bouquet and other characteristics of alcoholic fermented beverages. The fermented beverages utilized as initial materials may be, for example, beer or beverages of the beer type derived in whole or in part from cereals, such as ale, porter, stout, etc., or wines, cider, or the fermented liquids derived in whole or in part from fruit juices.

In the preparation of beverages low in alcohol or substantially non-alcoholic in character from such fermented beverages, it is necessary to dealcoholize the initial beverage, which is effected by the application of heat thereto. No matter what precautions are taken in effecting the removal of the alcohol there is invariably a deleterious effect produced upon the flavor, taste, bouquet, and other qualities of the beverage, and which are the criteria of its beverage character, particularly in such delicately flavored beverages as beers, wines, etc. The cause of this deleterious effect has been attributed to removal of volatile alcohols and esters, to caramelization of carbohydrates to coagulation or other injurious or destructive action upon the nitrogenous constituents of the beverage base, and to numerous other causes. In order to restore to the dealcoholized beverage residue its original flavor, taste, etc., or to produce desired fermentation flavors and tastes therein numerous expedients have been proposed, such as the carrying out of the dealcoholization under high vacuum and the return to the dealcoholized beverage of higher alcohols and esters. In my prior Patent No. 1,302,551 of May 6, 1919, I may have proposed the restoration to a dealcoholized fermented beverage, for example, beer, of its natural taste and flavor by producing therein a secondary yeast fermentation under conditions promoting yeast propagation, that is, permitting the carbon dioxid formed to escape, and subsequently carbonating the beverage artifically.

I have now discovered that a marked improvement in the beverage characteristics of a dealcoholized fermented beverage, for example, beer, may be made by adding to or supplying in the dealcoholized beverage a small quantity of volatile acids, particularly of the simpler organic acids such as formic acid, acetic acid and propionic acid. The fixed acid normally contained in the beverage, such as lactic acid, phosphoric acid or acid phosphates, and oxalic acid (the latter in minute traces) in beer, citric and tartaric acid in wine and malic acid in cider, remain in the dealcoholized beverage, but are not effective in producing therein the peculiar natural flavors and bouquets, which are of vital importance in producing the zest and palatability of the final beverage. The naturally contained volatile acids of the beverages are, however, removed or destroyed during the dealcoholization process.

In accordance with the present invention I add to the dealcoholized beverage a small proportion of volatile acid, such as acetic, formic or propionic acid or mixtures of any two or all three of said acids. The dealcoholized beverage is preferably cooled, prior to adding the volatile acid, to a temperature at which the acid added is not appreciably volatilized. In case the beverage is perfected as described in my prior Patent No. 1,302,551, referred to above, by adding fermentable matter and live yeast, for example, as fermenting wort in the case of dealcoholized beer, and causing fermentation to proceed without carbonating the beverage, thereby promoting yeast propagation, the volatile acid may be added after the said yeast fermentation has been completed and before artificial carbonation. In the treatment of dealcoholized beer the proportion of volatile acid which is added is preferably, in the case of acetic acid, approximately 0.5 grams per gallon of dealcoholized beverage, or in the case of formic, propionic and butyric acids, or mixtures thereof with each other or with acetic acid, the equivalent of this quantity. Thus, the addition of 0.55 grams of 99.1% acetic acid per gallon of dealcoholized beverage has a marked effect on the taste, flavor and bouquet of the final beverage. The amount of volatile acid, expressed as acetic acid, added should not exceed 0.05%.

The volatile acids suitable for the purpose of this invention, as previously recited, are in general the lower or more volatile members of the aliphatic series.

After the addition of the volatile acid to the dealcoholized beverage it is preferred that the latter be stored for a considerable period at a low temperature. I have discovered that under these conditions an improvement in the flavor, taste and bouquet of the beverage takes place, apparently by an esterifying action of the volatile acids upon the alcohols present in the beverage in the presence of the various enzyms contained in the beverage, particularly when perfected by a secondary yeast propagation. At the termination of a suitable period of time, for example, in the case of dealcoholized beer, two weeks at a temperature of 40 to 50° F. the esterifying or aging action will have been carried to a sufficient extent and the beverage may be prepared for the market.

I have further discovered that the addition of the volatile acid in the amounts described has a marked preserving effect upon the beverage, similar to that produced by the alcohol in natural alcoholic fermented beverages.

In the foregoing description of my invention I have given specific examples and advanced certain theories in illustration and explanation thereof. It is not intended, however, that these shall be regarded as of limiting effect upon the scope of the invention except in so far as included in the following claims.

I claim:

1. The process of improving the taste, flavor and bouquet of a dealcoholized fermented beverage which consists in adding thereto a small proportion of volatile saturated aliphatic acid.

2. The process of improving the taste, flavor and bouquet of a dealcoholized fermented beverage which consists in adding thereto less than 0.05% of volatile saturated aliphatic acid, expressed as acetic acid.

3. The process of improving the taste, flavor and bouquet of dealcoholized beer which consists in adding thereto a small proportion of volatile saturated aliphatic acid.

4. The process of improving the taste, flavor and bouquet of dealcoholized beer which consists in adding approximately 0.5 grams of acetic acid to each gallon of dealcoholized beer.

5. The process of improving the taste, flavor and bouquet of a dealcoholized fermented beverage which consists in producing therein a yeast fermentation without carbonating the beverage, adding a small proportion of volatile saturated aliphatic acid, and carbonating the beverage.

6. The process of improving the taste, flavor and bouquet of dealcoholized beer which consists in producing therein a yeast fermentation without carbonating the beverage, adding a small proportion of volatile saturated aliphatic acid, and carbonating the beer.

7. The process of improving the taste, flavor and bouquet of dealcoholized beer which consists in producing in the dealcoholized beer a yeast fermentation without carbonating the beverage, adding approximately 0.5 grams of acetic acid per gallon of beverage, and carbonating the beverage.

HERMAN HEUSER.